United States Patent [19]
Kao

[11] Patent Number: 4,876,895
[45] Date of Patent: Oct. 31, 1989

[54] ENGINEERING CONSTRUCTIVE LOAD CELL

[76] Inventor: Heng-er Y. Kao, 3F, No. 4-2, Lane 16, Wen-Chow Street, Taipei, Taiwan, 10616

[21] Appl. No.: 181,355

[22] Filed: Apr. 14, 1988

[30] Foreign Application Priority Data

Apr. 14, 1987 [JP] Japan .............................. 62-56127[U]

[51] Int. Cl.$^4$ .............................................. F16B 31/02
[52] U.S. Cl. ..................................... 73/761; 73/862.65
[58] Field of Search .................. 73/761, 774, 780, 785, 73/786, 862.62, 862.64, 862.65, 862.66, 862.67; 338/4, 5, 6, 36, 47; 177/211

[56] References Cited

U.S. PATENT DOCUMENTS

| | | | |
|---|---|---|---|
| 2,458,481 | 1/1949 | Ruge | 73/862.65 |
| 2,813,958 | 11/1957 | Mac Donald | 73/862.65 |
| 3,096,644 | 7/1963 | Seed | 73/862.65 |
| 3,164,014 | 1/1965 | Redner | 338/5 |
| 3,554,026 | 1/1971 | Seed | 73/862.65 |
| 3,872,719 | 3/1975 | Beus et al. | 73/761 |
| 4,079,624 | 3/1978 | Kurtz | 73/862.65 |
| 4,208,905 | 6/1980 | Spoor | 73/862.65 |

FOREIGN PATENT DOCUMENTS

| | | | |
|---|---|---|---|
| 1030597 | 6/1953 | France | 73/862.67 |
| 8300222 | 1/1983 | World Int. Prop. O. | 177/211 |

Primary Examiner—Stewart J. Levy
Assistant Examiner—Robert R. Raevis
Attorney, Agent, or Firm—Edwin E. Greigg

[57] ABSTRACT

A load cell that measures the weight of a load by use of a bolt anchored to a base. The bolt passes through an obstruction board which prevents soil or sand from overflowing, and a load cell is placed between a supporting spool-like pipe and a securing nut. The main body of the load cell is formed with a polygon flat surface to which strain gauges are secured adjacent at the corners of the polygon surface. The strain gauges are connected in an electrical circuit including an indicator which is calibrated to indicate the load.

8 Claims, 6 Drawing Sheets

ENGINEERING CONSTRUCTIVE LOAD CELL

BACKGROUND OF THE INVENTION

This invention relates to an engineering constructive load cell and more particularly to an improved load cell used to measure the weight of a load. The load cell is used in combination with an anchored bolt and a wall or an obstruction board which prevents any soil or sand from overflowing at an engineering construction site.

A prior art engineering constructive load cell, illustrated in FIGS. 8 and 9 is formed by use of an anchored bolt 37 which extends through an obstruction board 35 with a thin cylindrical elastic body 32 secured on the end of the bolt that protrudes through the obstruction board between a supporting pipe and a nut 38. Electrical strain gauges 33 are secured to the cylindrical surface of the elastic body and connected to an electrical circuit which measures a load placed on the elastic body by a load against the obstruction board. The strain placed on the strain gauges is a measure of the load placed on the obstruction board.

in a prior art load cell, illustrated in FIG. 9, a thin cylindrical elastic body 32 is sandwiched between a spool-like support placed against the obstruction board 35 and a shoulder on a nut 38 threaded on the bolt 37 which is anchored in a cement base 36. The obstruction board and elastic body is then fixed in place by the nut. As a material is placed in the area between the cement anchor and the obstruction board a compression strain is placed on the elastic body 32. Strain gauges placed on the thin cylindrical body are placed under a strain which changes the resistance of the strain gauges to a current flow. The load against the obstruction board as measured by current flow is a measure of the strain on the elastic body which is equated as load by an attached electrical circuit which is well known in the prior art.

In the prior art load cell the elastic body must be made thin so that the load on the elastic body causes a strain in the surface which can be measured by the strain gauges.

In the prior art device the cross sectional area of the elastic body has been made very thin so that the stress or strain on the elastic body will produce a large strain value. Making the elastic body thinner weakens the body so that under heavy loads the body will buckle which prevents obtaining an accurate load. Applicant has determined that when elastic bodies are made thinner to obtain greater sensitivity it can only be used for small loads to avoid buckling.

SUMMARY OF THE INVENTION

It is therefore an object of the invention to produce a highly sensitive load cell which can measure the weight of a heavy load without detrimental effects such as buckling.

The invention will be better understood and further objects and advantages thereof will become more apparent from the ensuing detailed description of a preferred embodiment taken in conjunction with the drawings.

DETAILED DESCRIPTION

Figure 1:
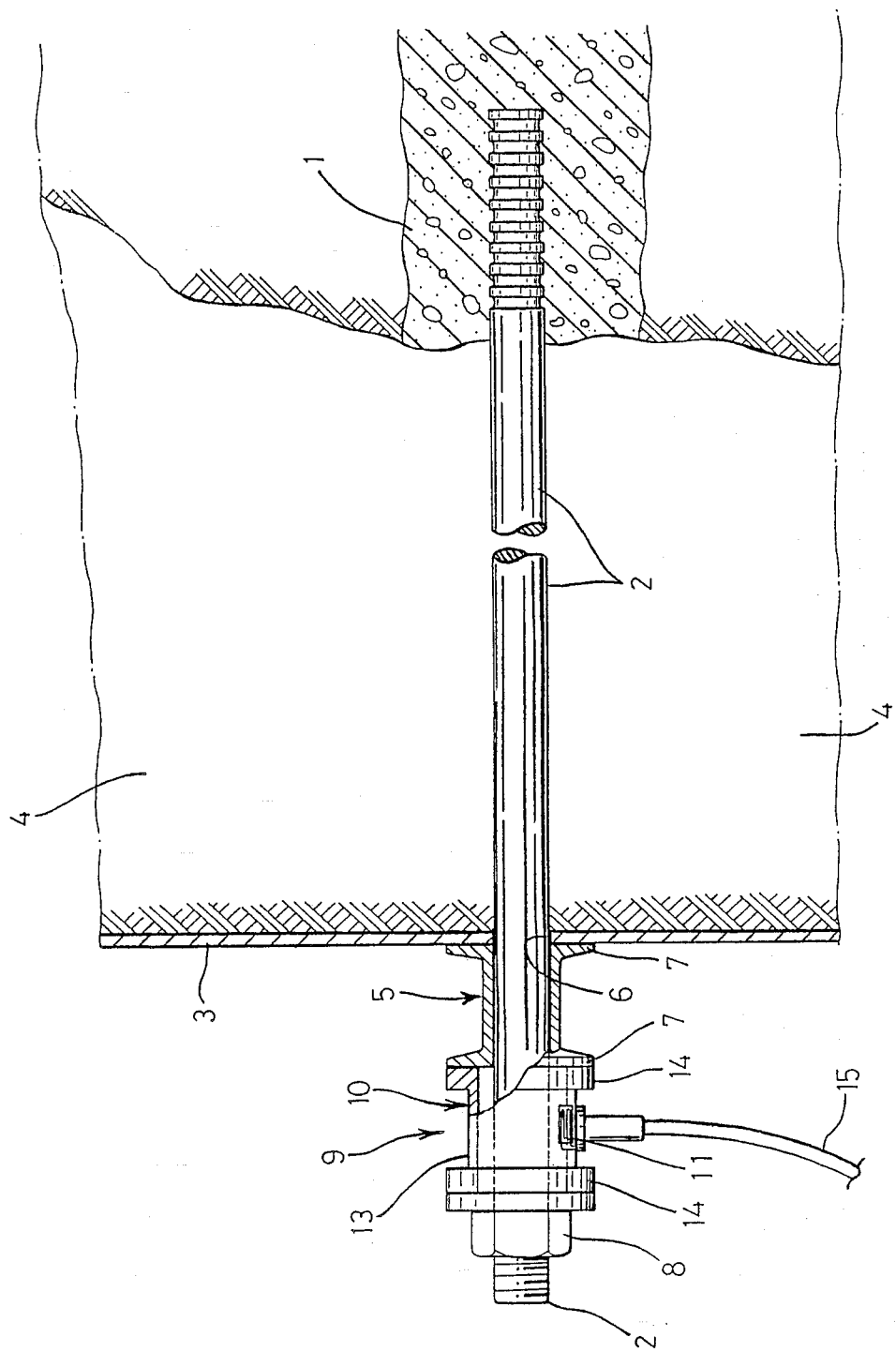
FIG. 1 illustrates one modification of the inventive load cell.
Figure 2:
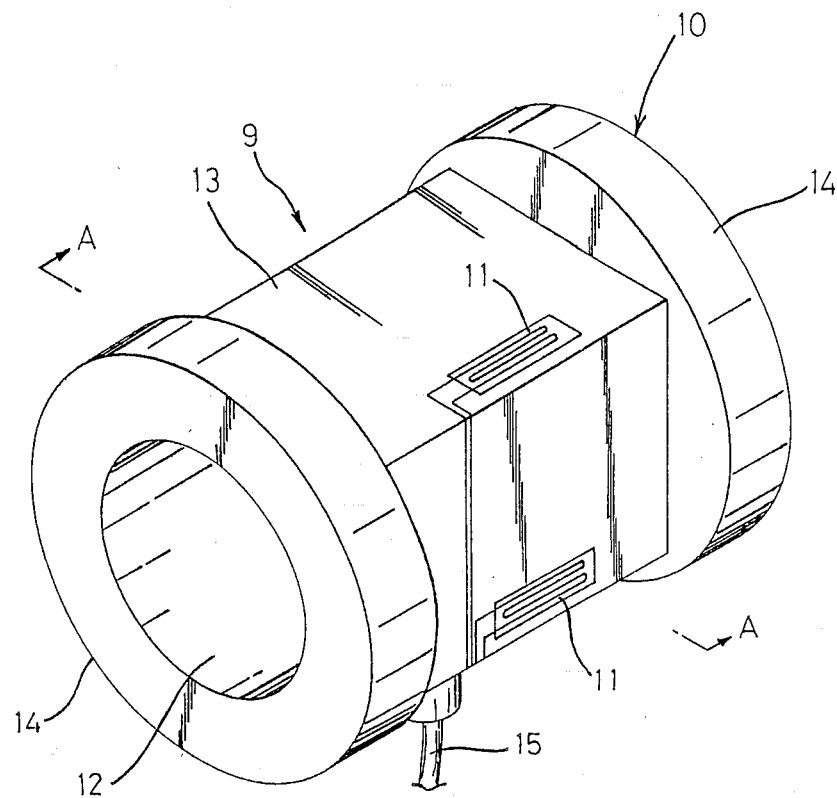
FIG. 2 is a perspective view of the load cell made in accordance with the modification shown in FIG. 1.
Figure 3:
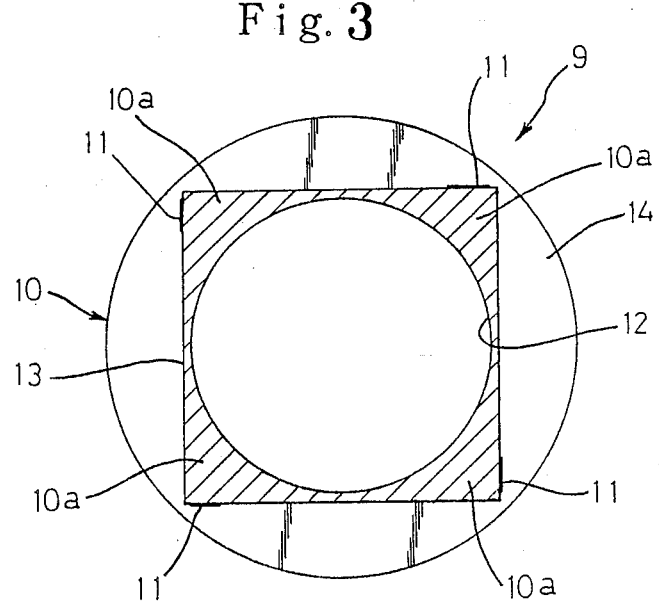
FIG. 3 is a cross-sectional view along lines A—A of FIG. 2.
Figure 4:
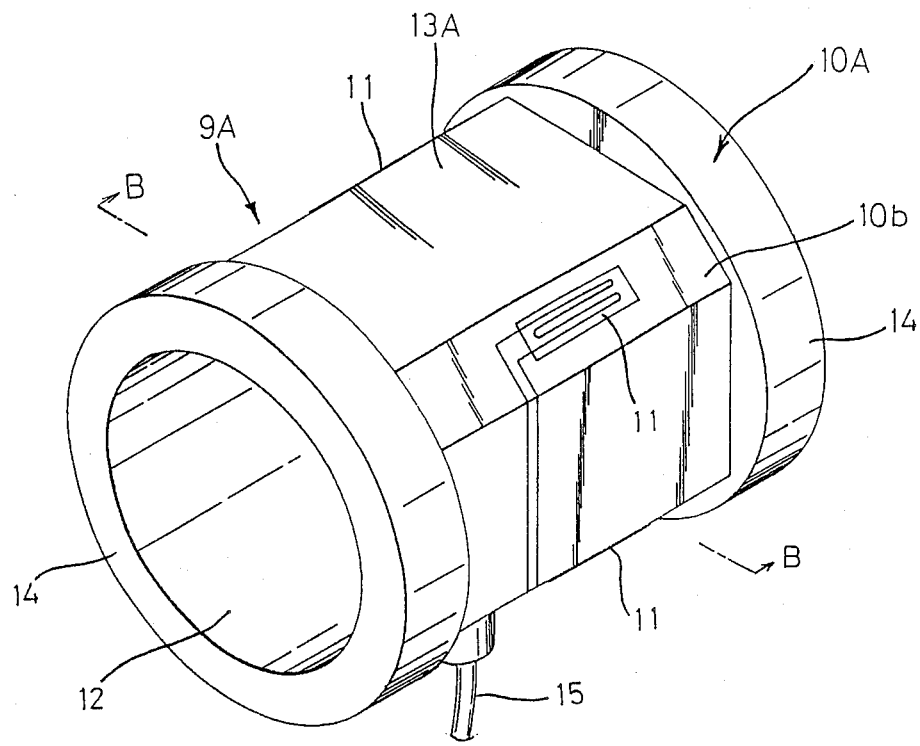
FIG. 4 is a perspective view of a first modification of the load cell shown in FIG. 1.
Figure 5:
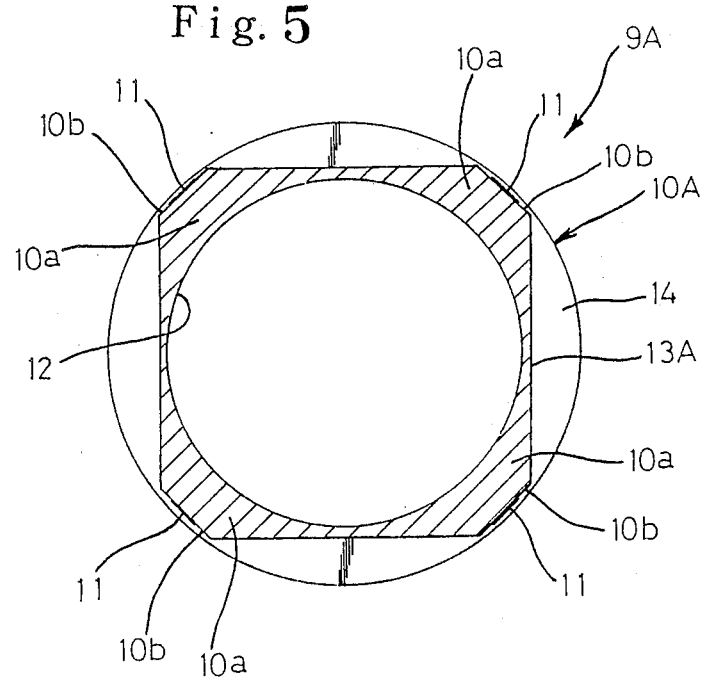
FIG. 5 is a cross-sectional view along lines B—B of FIG. 4.

Now referring to the drawings in which like reference characters represent like parts there is shown in FIGS. 1-3, a load cell made in accordance with this invention. As shown, one end of a bolt or threaded rod 2 is fixed in a cement base 1 and extends therefrom in a horizontal plane. One end of the bolt passes through an aperture 6 in a wall such as an obstruction board 3 which prevents soil or sand from flowing from the structure. A spool-like pipe 5 having flanged supporting ends 7 is placed over the bolt 2 next to the obstruction board 3 on a side away from the base 1. A load cell 9 is placed on the bolt next to the spool-like pipe 5 and is held in place by a nut 8 having a flanged end toward the load cell and threaded onto the end of the threaded rod such that the load cell is sandwiched between the nut and spool-like pipe 5.

The load cell 9 is composed of an elastic body that is formed by a hard rubber, synthetic resin or any other suitable material. The load cell has a cylindrical axially aligned aperture 12 with an inner diameter which is greater then the bolt with cylindrical end flanges 14 spaced apart by a square main body 13. Strain gauges of well known electrical resistance type are secured across a central plane perpendicular to the axis with the ends of the strain gages equally spaced from the flanges 14 and adjacent to each corner of the square main body. The strain gauges are connected into an electrical circuit, not shown, which is well known in the art. The electrical circuit includes an indicator or recorder which indicates any resistance change in the strain gauge according to current flow which is calibrated to indicate the load placed on the elastic body.

In assembly and use of the load cell, it is necessary that an anchor bolt or threaded rod 2 be secured or anchored in a fixed structure such as a cement base 1 with the bolt extending from the base horizontally. The bolt passes through a movable wall or obstruction 3 substantially in the center thereof and protrudes from the opposite side. The spool-like support pipe 5 is placed over the end of the bolt that protrudes through the obstruction. The load cell 9 with the strain gauges 11 cemented thereon is placed next to the support pipe 5 then the nut 8 is threaded against the load cell in a tight fit but not so tight as to cause a strain on the elastic body of the load cell. The strain gauges are then connected with the electrical circuit-indicator. As well known in the art, the indicator should now be calibrated to read zero without any load on the load cell. Soil, sand, etc., may now be placed in the area between the base and the obstruction board and the load produced by the soil or sand on the obstruction board will produce a strain on the load cell which strain will be measured by the strain gauges and indicated as a load.

The load on the elastic body is supported by the thickened areas at the corners 10a. Therefore, the thickness along the width of the sides and the cross sectional area can be made thin, as shown in FIG. 3 and yet prevent buckling. Thus, the strain value is greater because of the thin cross section of the elastic body and the strain that arises at each corner becomes greater. Therefore the measured value of the strain gauges is more accurate and can measure small loads. The measured load value is an average of each of the strain gauges, it is more accurate and can measure the weight of a load without any deviations due to an eccentric load in each direction of the load cell corners.

FIGS. 4–7 illustrate modifications of the load cell as set forth in FIGS. 1–3. The same reference characters will be used for like parts and a complete description of the parts set forth above will not be repeated. The modification shown by FIGS. 4 and 5 differ from the load cell shown in FIGS. 1–3 wherein the corners 10b of the square are cut-off to form an eight sided main body and the main body at the cut-off corners extend outwardly substantially to the circumference of the flanges 14 on the ends of the load cell. The corners are cut along an imaginary square. One each of the strain gauges are secured or cemented to the main body along the cut-off corners 10b. The strain gauges are connected to an electrical circuit and the operation is as explained for the load cell of FIGS. 1–3.

Figure 6:
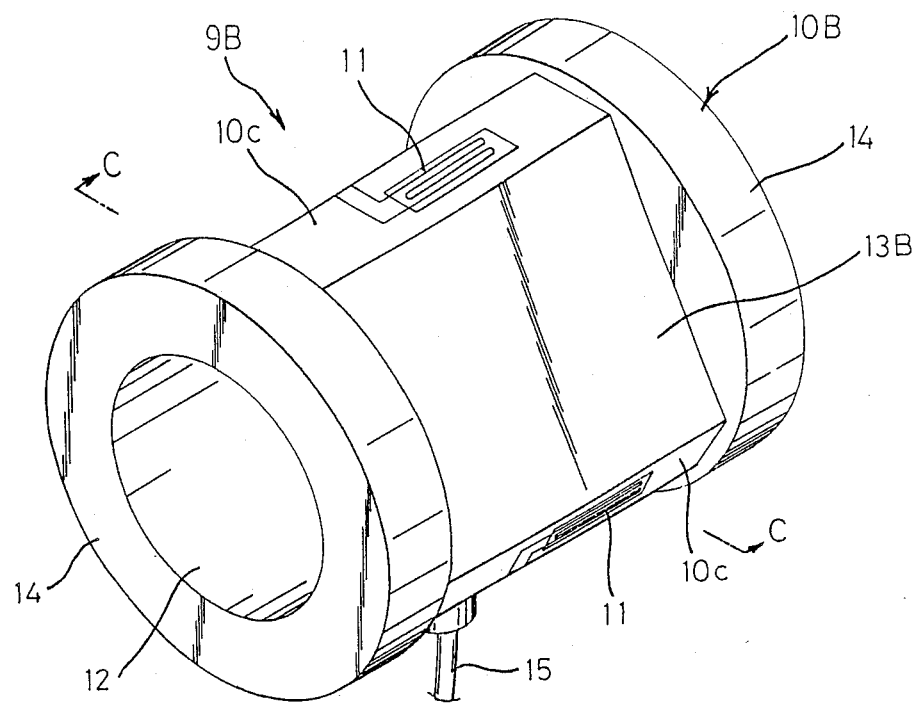
FIG. 6 illustrates a second modification of the load cell.
Figure 7:
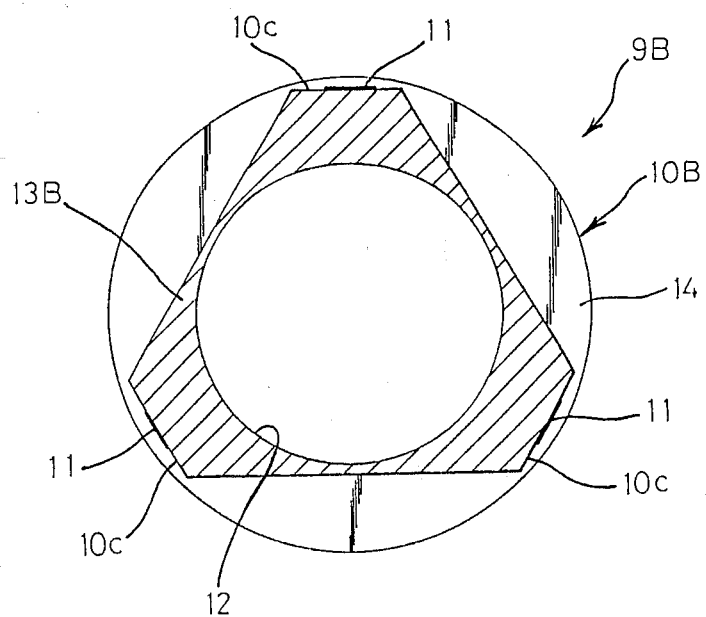
FIG. 7 is a cross-sectional view along lines C—C of the load cell shown in FIG. 6.
Figure 8:
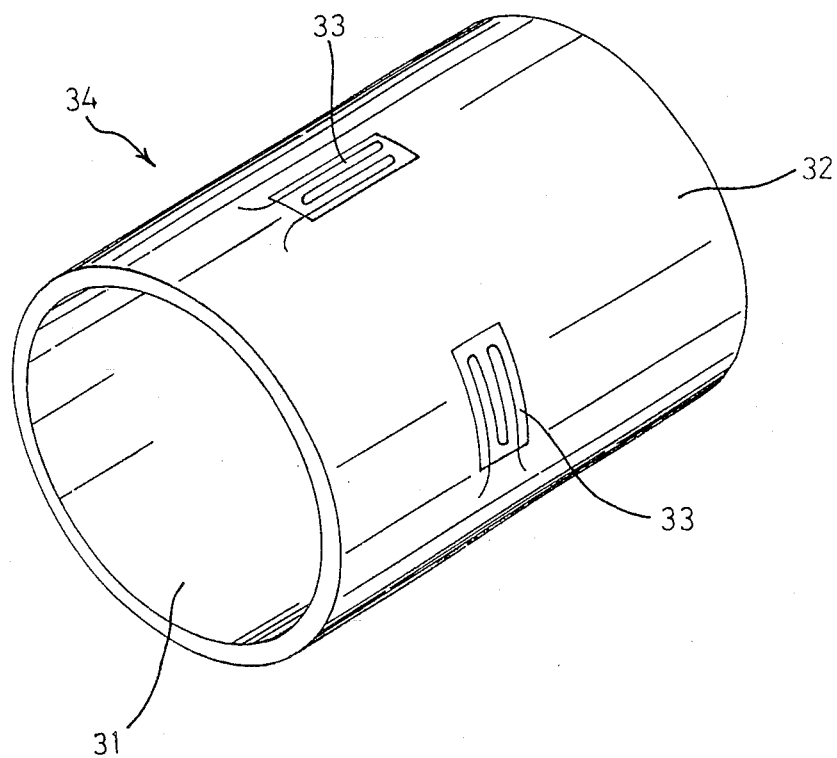
FIG. 8 illustrates a load cell of the prior art.
Figure 9:
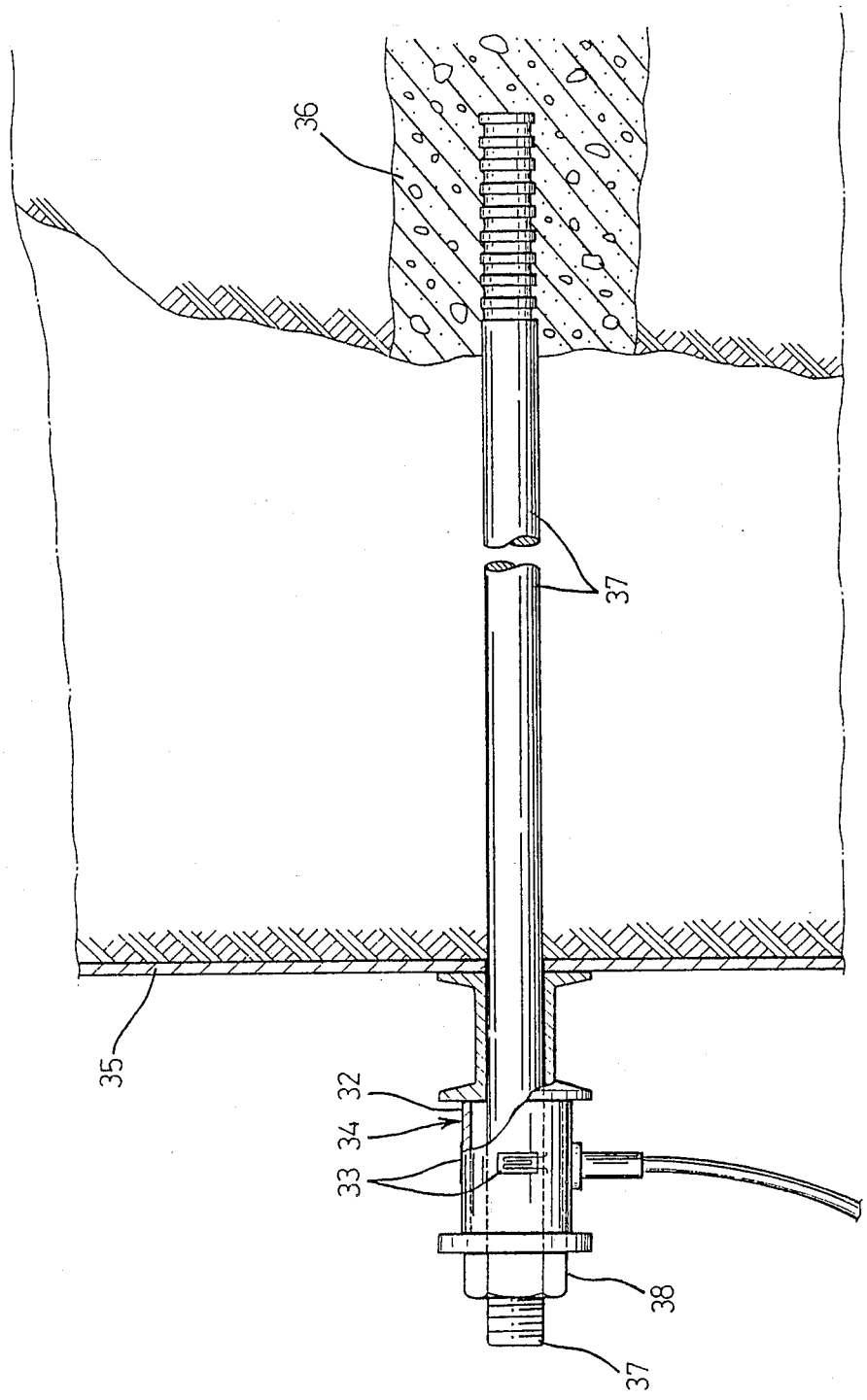
FIG. 9 illustrates the prior art load cell shown in FIG. 8 used for determining a load.

FIGS. 6 and 7 illustrate a second modification. As shown in FIGS. 6 and 7, the main body is shaped triangular with the points 10c of the triangle cut-off along an imaginary triangle. The cut-off point sections extend substantially to the circumference of the flanges on the ends of the load cell. Thus, the main body of the load cell has six sides and the strain gauges 11 are affixed to the flat surfaces of the cut-off corners of the triangle. The strain gauges are connected to an electric circuit as set forth above. As seen in FIGS. 4–7, the corners are greater in thickness than the sides between the corners.

It is obvious from the above descriptions of the different modifications that the main body of the cylindrical elastic body load cell is formed with an outer polygon surface with an inner cylindrical surface which is greater than the anchor bolt. Each of the corners of the elastic body becomes a thickened area along the length which are equidistant circumferentially from each other. Thus, each of the corners support most of the load which permits forming the sides between each corner much thinner than the corners. The strain gauges are affixed to flattened surfaces along the corners.

Thus, the strain gauges are subjected to a greater stress and strain value in the load cell and will therefore be more sensitive and can measure small loads more accurately. Further the surfaces to which the strain gauges are affixed are flat surfaces so that they are not likely to come loose from the surface.

The foregoing relates to a preferred exemplary embodiment of the invention, it being understood that other variants and embodiments thereof are possible within the spirit and scope of the invention, the latter being defined by the appended claims.

What is claimed is:

1. A load cell for use in determining a load placed upon said load cell which comprises:
   a main body having an axially aligned cylindrical aperture and outwardly extending cylindrical end flanges integral with said main body with an outer central portion separating said cylindrical end flanges,
   said outer central portion of said main body having an outer polygonal shape with equally spaced corners along the length of said outer central portion of said main body, and
   one each of a plurality of strain gauges affixed adjacent each of said equally spaced corners with each of said strain gages equally spaced from said cylindrical outwardly extending end flanges.

2. A load cell as set forth in claim 1, in which:
   said outer central portion of said main body is formed as a square.

3. A load cell as set forth in claim 1, in which:
   said outer central portion of said main body is formed as a square with each of the corners cut off to form an eight sided outer central portion of said main body, and
   said strain gauges are secured along the cut-off corners.

4. A load cell as set forth in claim 1, in which:
   said outer central portion of said main body is formed as a triangle with the corners of the triangle cut-off to form a six sided surface, and said strain gauges are affixed to said cut-off corners.

5. A load determining device including a load cell, which comprises:
   a fixed base,
   a threaded rod secured to said fixed base and protruding therefrom,
   an obstruction wall,
   said obstruction wall including an aperture through which said protruding rod extends,
   a supporting means on said rod adjacent said wall,
   a load cell on said rod adjacent said supporting means,
   a threaded nut threaded onto said threaded rod to fix said load cell between said supporting means and said threaded nut,
   said load cell including a main body having an axially aligned cylindrical aperture and outwardly extending cylindrical end flanges on each end of said main body, with an outer central portion separating said cylindrical flanges,
   said outer central portion of said main body having an outer polygonal shape with equally spaced corners along the length of said outer central portion of said main body, said central portion having non-uniform thickness between said corners, and
   one each of a plurality of strain gauges affixed adjacent each of said equally spaced corners with each of said strain gages equally spaced form said cylindrical outwardly extending end flanges.

6. A load cell as set forth in claim 5, in which:
   said outer central portion of said main body is formed as a square.

7. A load cell as set forth in claim 5, in which:
   said outer central portion of said main body is formed as a triangle with the corners of the triangle cut-off to form a six sided surface, and said strain gauges are affixed to said cut-off corners.

8. A load cell as set forth in claim 5, in which:
   said outer central portion of said main body is formed as a square with each of the corners cut-off to form an eight sided main body, and
   said strain gauges are secured along the cut-off corners.

* * * * *